Aug. 13, 1940. E. R. STOEKLE ET AL Re. 21,533

APPARATUS FOR CONTROLLING ELECTRICAL AND OTHER OPERATING CONDITIONS OF ELECTRICAL CIRCUITS

Original Filed July 20, 1923

Inventors

Erwin R. Stoekle, deceased, by Cutler - Hammer, Inc., by W.C. Stevens, Vice President Arthur Simon By Frank H. Hubbard Attorney Reissued Aug. 13, 1940 Re. 21,533

UNITED STATES PATENT OFFICE 21,533

APPARATUS FOR CONTROLLING ELECTRICAL AND OTHER OPERATING CONDITIONS OF ELECTRICAL CIRCUITS

Erwin R. Stoekle, deceased, late of Milwaukee, Wis., by Cutler-Hammer, Inc., assignee, Milwaukee, Wis., and Arthur Simon, Milwaukee, Wis.; said Stoekle and said Simon assignors, by mesne assignments, to said Cutler-Hammer, Inc., a corporation of Delaware Original No. 1,582,702, dated April 27, 1926, Serial No. 652,713, July 20, 1923. Application for reissue March 16, 1939, Serial No. 262,322

12 Claims. (Cl. 172—239)

This invention relates to method of and apparatus for controlling electrical and other operating conditions of electric circuits.

More particularly the invention relates to light responsive control of such conditions of a circuit or circuits.

The present invention is disclosed in our copending application Serial No. 175,992, filed June 21, 1917, of which the present application is in the nature of a continuation, an adaptation of the present invention to the fluid metering art being claimed in said copending application. Also certain features of the present invention are disclosed but not claimed in prior patent of E. R. Stoekle #1,361,197 of Dec. 7, 1920, filed Oct. 5, 1917.

The present application contemplates adaptation of the invention to control of electrical and other operating conditions of electric circuits generally.

Thus an object of the present invention is that of providing for light responsive control of electrical and other operating conditions, other than or in addition to electrical continuity, of one or more electric circuits.

Another object is that of providing for exceedingly sensitive, accurate and reliable control including light responsive control of such conditions of an electric circuit or circuits.

Another object is that of providing advantageous methods of effecting such control.

Another object is that of providing improved apparatus for enactment of the aforementioned methods.

Other objects and advantages will hereinafter appear.

In the accompanying drawing, wherein are illustrated certain of the embodiments which the invention may assume in practice.

Figure 1:
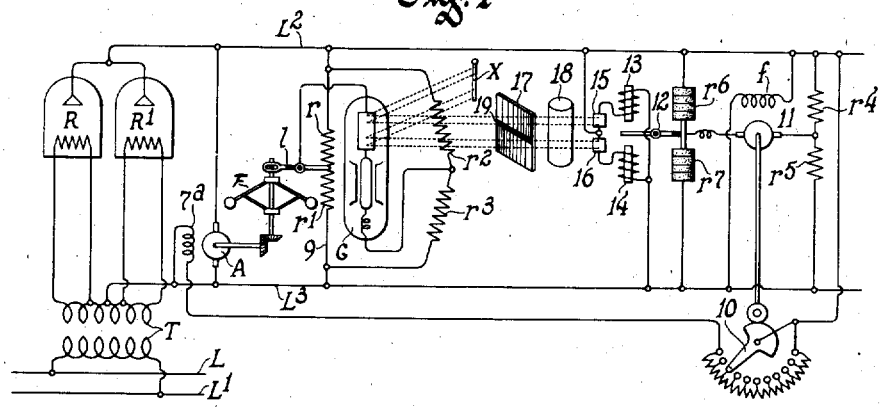
Figure 2:
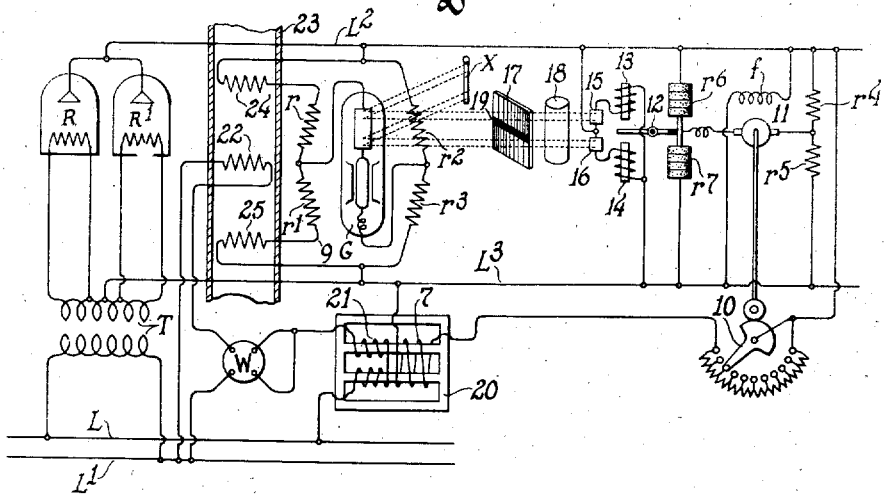

Figure 1 is a diagrammatic and schematic view illustrating generically applicability of the invention to the control of electric circuits, as exemplified in the motor field circuit shown: while Fig. 2 is a similar view, corresponding to the single view or figure of our copending application aforementioned, and further illustrating the general applicability of the invention, the same being in this case applied in the fluid metering art.

Referring to the drawing and particularly to Fig. 1 thereof, the same illustrates an electric circuit, viz, that including coil $7^a$, to be regulated as to its electrical and other operating conditions in accordance with the methods hereinafter set forth. In the embodiment illustrated said circuit comprises the shunt field circuit of a motor having an armature A to be supplied from D. C. lines $L^2L^3$ across which said field circuit is also connected, said lines to be in turn supplied from a suitable or convenient source such as lines LL', transformer T and rectifiers RR'.

Obviously by the foregoing arrangement the speed of motor armature A is controllable through energization control of the circuit of its field coil $7^a$, as by rheostat 10, whereas, by the means now to be described, control of the setting of said rheostat is effected automatically in accordance with and to compensate for variations in speed of the motor and also with exceeding accuracy and sensitivity.

To such end a reversible operating motor 11 is provided for rheostat 10, said motor having a shunt field $f$ to be connected across lines $L^2L^3$ and having its armature circuit also connected across said lines by means of a Wheatstone bridge connection as illustrated.

Two legs of said bridge comprise fixed resistances $r^4$ and $r^5$, while the other two legs thereof comprise variable resistances $r^6$ and $r^7$, the latter being illustrated as of the carbon pile type. Thus the variable resistances $r^6$ and $r^7$ provide by relative adjustments thereof, for selectively rendering the motor inert, starting the same in either direction and varying the speed thereof, said resistances being so adjustable by an element 12 controlled by electro-magnets 13 and 14. The electro-magnets 13 and 14 are arranged to act differentially upon the member 12 and controllable through the medium of selenium cells 15 and 16 to vary the relative adjustment of said resistances.

More specifically, the windings of the electro-magnets 13 and 14 are connected in parallel across the D. C. circuit with the selenium cell 15 in the branch of the electro-magnet 13 and the selenium cell 16 in the branch of the electro-magnet 14. Thus as will be understood, the selenium cells may be influenced to render either electro-magnet predominant for starting the motor 11 in a corresponding direction and moreover predominant to varying degrees for graduation of the speed of the motor. Also, as will be understood, the selenium cells may be influenced to produce such results by subjecting the same to beams of light of varying intensity and it is in such a manner that said electro-magnets 13 and 14 are subjected to energization control jointly and differentially in accordance with variations in speed of armature A, as by the means now to be described.

To such end a flyball governor F, or its equivalent is arranged to be actuated by said armature and upon variation in speed of the latter to effect corresponding and proportional adjustment of levers $l$ which in turn correspondingly varies the apportionment of resistance between the legs $rr'$ of another Wheatstone bridge 9 also connected across supply lines $L^2L^3$, the other two legs of said bridge comprising fixed resistors $r^2r^3$. Said bridge 9 is further provided with a galvanometer G of the mirror type.

The galvanometer is subjected to a beam of light from a linear source $x$ and reflects such light through a shade screen 17 and a cylindrical lens 18 onto the selenium cells. The screen 17 is provided with an opaque band 19 which divides the beam of light reflected by the galvanometer into separate and distinct beams for the two cells. Also, the screen sections on opposite sides of the band are shaded in a reverse relation, whereby the most opaque portion of the upper section is aligned with the most transparent portion of the lower section, with the result that as the galvanometer mirror shifts its position to decrease the intensity of light reflected on one selenium cell, it will at the same time correspondingly increase the intensity of light reflected on the other cell. The arrangement thus provides for influencing the selenium cells throughout a wide range and to a degree proportional to the deflection of the galvanometer.

Hence, assuming an adjustment of the apparatus such that the galvanometer equalizes the beams of light reflected upon the selenium cells under given or desired speed conditions of armature A, the setting of the various control instrumentalities, including rheostat 10, will be maintained so long as such speed remains constant. However, upon occurrence of a change in speed of said armature the bridge 9 is adapted to become unbalanced, thereby causing deflection of the galvanometer and of the beam of light projected upon selenium cells 15 and 16 in a corresponding sense and to a proportional degree. As a result of such action motor 11 becomes correspondingly energized for effecting such adjustment of rheostat 10, and consequent regulation of the energization of coil $7^a$, as to restore the desired speed conditions of armature A. Moreover following each such adjustment the balance of bridge 9 is restored whereby the galvanometer will resume its initial position for maintaining the adjustment pending subsequent change in speed of said armature A.

Obviously if said armature be subjected to conditions of constant load and energization, the field $7^a$ being separately energized, the device is adapted to maintain a constant value of the energization of said field circuit irrespective of variations in electrical conditions of its source.

In Fig. 2, which is identical with the illustration of our copending application aforementioned is illustrated a specifically different adaptation of the aforedescribed control, viz. to the fluid metering art.

In this instance the coil 7, corresponding to the field coil $7^a$ aforedescribed comprises the D. C. or control winding of a magnetic amplifier 20 having an A. C. winding 21 which is arranged to be in circuit with an electric heater 22, a wattmeter W being also arranged in circuit to measure the electrical input to said heater. Said heater is utilized in a conventional type of fluid meter for imparting continuously to the stream of fluid flowing in a conduit 23 such values of heat as to maintain a constant temperature rise of the stream of fluid passing said heater, irrespective of variations in rate of flow of said stream of fluid. Under such conditions, the variations in rate of energy input to the heater constitute a measure of the variations in rate of flow of the fluid whereby the wattmeter W may be either of the indicating or the integrating type. The control means aforedescribed in connection with Fig. 1 is herein utilized for controlling and varying the electrical input to the heater accurately in accordance with and to compensate for variations in temperature rise of the fluid, which are incident and proportional to variations in its rate of flow.

To such end resistance thermometer units 24 and 25 each comprising essentially a resistor adapted to change in ohmic value proportionally to changes in temperature to which the same is subjected, are arranged in the stream of fluid for subjection to the temperature thereof before and after passing the heater 22. Said resistance thermometer units are respectively connected in series with and constitute in effect portions of the individual resistance legs $r$ and $r'$ of Wheatstone bridge 9.

It thus follows that a change in temperature rise of the fluid will cause unbalance of said bridge, whereby the various control instrumentalities are actuated, as in the construction of Fig. 1 aforedescribed, for effecting proportional variation in energization of coil 7, which changes are transmitted in amplified form to the circuit of heater 22 and are indicated by wattmeter W.

It will be readily understood that employment of magnetic amplifier 20 enables control of relatively high values of A. C. electrical energy in the heater circuit through control of relatively feeble values of D. C. energy whereby the rheostat 10 and its associated instrumentalities may be of correspondingly light and even delicate construction. It is, however, obvious that assuming said rheostat to be of suitable ohmic value and other characteristics the same may be connected in the heater circuit for direct control of the latter.

The aforedescribed apparatus thus provides for exceedingly fine and accurate control, including light-responsive control, of the operating conditions, that is to say current, voltage and the like of a circuit, as for example the circuit including the field coil $7^a$ and also provides for corresponding amplified control of the electrical condition of the circuit including the heater 22, whereas the character of such control is in no wise dependent upon the character of the power consuming or translating devices included in such circuits. On the other hand such field coil and heater or the like are to be regarded as merely typical of certain of the classes of devices to which the present control system is applicable.

What we claim as new and desire to secure by Letters Patent is:

1. A device for controlling an electrical condition of a circuit, comprising means sensitive to an electrical condition of said circuit, means controlled by the condition sensitive means for directing a beam of light with reference to a given direction thereof, and means for varying certain of the characteristics of the circuit to a degree corresponding to the difference between the given direction and the actual direction of the beam.

2. In a control system of the character described, in combination, electro-responsive circuit controlling means, means sensitive to variations in light for governing the operation thereof and means responsive to varying electrical conditions for subjecting said sensitive means to variations in light.

3. In a control system of the character described, the combination with electro-responsive means including an electric motor and control means therefor, of means sensitive to variations in light for influencing said control means and means coordinated with said electro-responsive means and responsive to varying electrical conditions for subjecting said sensitive means to variations in light.

4. In a control system of the character described, in combination, a Wheatstone bridge, electro-responsive means, and means for subjecting said electro-responsive means to the influence of said Wheatstone bridge upon unbalancing thereof, said second mentioned means including a selenium cell associated with said electro-responsive means and a galvanometer device associated with said Wheatstone bridge to subject said selenium cell to variations in light.

5. In a control system of the character described, in combination, a Wheatstone bridge to be subjected to conditions tending to unbalance the same, electro-responsive means to be influenced by said bridge upon unbalancing thereof, said means being co-ordinated with said bridge for operation to restore the latter to balanced condition, and means for subjecting said electro-responsive means to influence by said bridge, including a selenium cell associated with said electro-responsive means and a galvanometer device associated with said bridge to subject said selenium cell to variations in light.

6. In a control system of the character described, in combination, a Wheatstone bridge to be subjected to conditions tending to unbalance the same, means including electro-responsive elements differentially related to each other to be influenced by said bridge upon unbalancing thereof, said means being co-ordinated with said bridge for operation to restore the latter to balanced condition, and means for subjecting said first mentioned means to influence of said bridge including a plurality of selenium cells associated respectively with said electro-responsive elements and a galvanometer device associated with said bridge to subject said selenium cells to variations in light.

7. A control mechanism comprising, in combination, a circuit operatively including a resistor and a contactor engaged therewith and movable therealong, a source of light, a galvanometer electrically connected to a fixed portion of said circuit and operatively connected to said movable contactor, a mirror carried by an oscillatable part of said galvanometer and arranged to reflect a beam of light from said source, photo-sensitive electrical means in the path of the beam of light reflected from said mirror and having a characteristic variable in accordance with the deflection of the beam of light with respect to a balanced position of the galvanometer, relay means responsive to the operation of said photo-sensitive electrical means, and means including a reversible electric motor controlled by said relay means to operate said movable contactor toward a galvanometer-balancing position.

8. A control mechanism comprising, in combination, a circuit including a resistor and a contactor engaged therewith and movable therealong, a source of light, a galvanometer electrically connected to a fixed portion of said circuit and to said movable contactor, a mirror carried by an oscillatable part of said galvanometer and arranged to reflect a beam of light from said source, photo-sensitive electrical means in the path of the beam of light reflected from said mirror and having a characteristic variable in accordance with the deflection of the beam of light with respect to a balanced position of the galvanometer, relay means responsive to the operation of said photo-sensitive electrical means, and means including a reversible electric motor controlled by said relay means to operate said movable contactor toward a galvanometer-balancing position.

9. In combination, a galvanometer having a mirror for deflecting a beam of light reflected therefrom relative to a null position of the beam, means for operating said galvanometer to effect such deflection of the beam, photo-electric means in the path of the beam, a reversible electric motor governed by said photo-electric means, and means actuable by said motor to restore the beam to the null position upon a deflection therefrom.

10. In combination, a galvanometer having a mirror for deflecting a beam of light reflected therefrom relative to a null position of the beam, means for operating said galvanometer to effect such deflection of the beam, photo-electric means in the path of the beam, relay means operable by said photo-electric means, a reversible electric motor governed by said relay means, and means actuable by said motor to restore the beam to the null position upon a deflection therefrom.

11. In combination, means having an electrical characteristic adapted to be varied in accordance with variations in a physical condition such as temperature, a galvanometer connected to said means and responsive to variations in said characteristic, comparison balancing means connected to the galvanometer, associated means having an automatically variable value for effecting balancing of said first named means against said comparison balancing means, said associated means including a movable element, a light, photo-electric means for governing the operation of said movable element, means positioned by the galvanometer to affect the light reaching the photo-electric means in accordance with the position of the galvanometer, means operatively connecting the photo-electric means with said movable element and controlled by the photo-electric means to operate the movable element in accordance with the position of the galvanometer, whereby the value of said physical condition is maintained substantially constant.

12. In combination, means having an electrical characteristic adapted to be varied in accordance with variations in a physical condition such as temperature, a galvanometer connected to said means and responsive to variations in said characteristic, comparison balancing means connected to the galvanometer, associated means having an automatically variable value for effecting balancing of said first named means against said comparison balancing means, said associated means including a movable element, a light, photo-electric means for governing the operation of said movable element, means positioned by the galvanometer to affect the light reaching the photo-electric means in accordance with the position of the galvanometer, means operatively connecting the photo-electric means with said movable element and controlled by the photo-electric means to operate the movable element in accordance with the position of the galvanometer, said associated means also including means governed by said movable element for controlling said physical condition.

ERWIN R. STOEKLE, *deceased*,
By CUTLER-HAMMER, INC.,
By W. C. STEVENS,
*Vice President*.
ARTHUR SIMON.